(12) United States Patent
Ferreira de Melo et al.

(10) Patent No.: US 8,951,390 B2
(45) Date of Patent: Feb. 10, 2015

(54) REACTOR FOR THE CONTINUOUS PRODUCTION OF CHARCOAL

(75) Inventors: Vamberto Ferreira de Melo, Belo Horizonte (BR); Túlio Jardim Raad, Sete Lagoas (BR); Romero Mantuano Netto, Belo Horizonte (BR); Henri Bordet, Voulaines les Templiers (FR); Remi Bordet, Ceyrat (FR)

(73) Assignee: V&M do Brasil S.A., Belo Horizonte MG (BR)

( * ) Notice: Subject to any disclaimer, the term of this patent is extended or adjusted under 35 U.S.C. 154(b) by 1231 days.

(21) Appl. No.: 12/865,265

(22) PCT Filed: Jan. 29, 2009

(86) PCT No.: PCT/BR2009/000022
§ 371 (c)(1),
(2), (4) Date: Jul. 28, 2011

(87) PCT Pub. No.: WO2009/094736
PCT Pub. Date: Aug. 6, 2009

(65) Prior Publication Data
US 2011/0290633 A1    Dec. 1, 2011

(30) Foreign Application Priority Data

Jan. 29, 2008 (BR) ...................................... 0800063
Jul. 30, 2008 (EP) ...................................... 08290734

(51) Int. Cl.
*C10B 1/04* (2006.01)
*C10B 49/02* (2006.01)
(Continued)

(52) U.S. Cl.
CPC . *C10B 1/04* (2013.01); *C10B 57/02* (2013.01); *C10B 49/02* (2013.01); *C10B 53/02* (2013.01); *Y02E 50/14* (2013.01)
USPC ........... 202/124; 202/150; 202/262; 422/610; 422/150

(58) Field of Classification Search
CPC .......... C10B 1/04; C10B 49/02; C10B 53/02; C10B 57/02
USPC ................... 202/124, 150, 262; 422/610, 150
See application file for complete search history.

(56) References Cited

U.S. PATENT DOCUMENTS 1,739,786 A    12/1929  Dieterle
2,885,338 A    5/1959   Evans
(Continued)

FOREIGN PATENT DOCUMENTS

BR    PI 0700501-6 A    9/2008
FR    872 551 A         6/1942
(Continued)

OTHER PUBLICATIONS

International Search Report mailed Jun. 12, 2009 of corresponding international application PCT/BR2009/000022, filed Jan. 29, 2009.
(Continued)

*Primary Examiner* — Nina Bhat
*Assistant Examiner* — Jonathan Miller
(74) *Attorney, Agent, or Firm* — Alston & Bird LLP

(57) ABSTRACT

A reactor for the continuous production of charcoal, having a substantially vertical structure, comprising, in sequence, a top charging zone, a drying zone, a carbonization zone, a cooling zone, and a discharge zone, wherein the charging zone has a smaller cross section than the drying zone and has an extension into the drying zone, forming an annular space around the extension, which space comprises, in the wall of the drying zone, an outlet to a gas extraction line for the recirculation of these gases into the reactor. The reactor reduces sawdust drag by the gases extracted from the preheating zone, without substantially altering the shape and the size of the reactor, which is achieved due to the fact that the charging zone is arranged eccentrically relatively to the drying zone, and that the outlet to the gas extraction line of the drying zone is located substantially on the larger area section of the annular space.

7 Claims, 2 Drawing Sheets

(51) Int. Cl.
*C10B 53/02* (2006.01)
*C10B 57/02* (2006.01)

(56) References Cited

U.S. PATENT DOCUMENTS

| | | | |
|---|---|---|---|
| 4,148,694 A * | 4/1979 | Schulte et al. | 202/262 |
| 4,247,367 A * | 1/1981 | Reilly | 202/105 |
| 4,261,795 A * | 4/1981 | Reilly | 202/118 |
| 5,584,970 A | 12/1996 | Schmalfeld et al. | |

FOREIGN PATENT DOCUMENTS

| | | |
|---|---|---|
| FR | 2 331 752 | 6/1977 |
| FR | 2 416 931 A1 | 9/1979 |

OTHER PUBLICATIONS

Written Opinion mailed Jun. 12, 2009 of corresponding international application PCT/BR2009/000022, filed Jan. 29, 2009.

* cited by examiner

REACTOR FOR THE CONTINUOUS PRODUCTION OF CHARCOAL

CROSS REFERENCE TO RELATED APPLICATIONS

This application is a national stage application, filed under 35 U.S.C. §371, of International Application No. PCT/BR2009/000022, filed Jan. 29, 2009, which claims priority to European Application No. EP 08290734.6 filed on Jul. 30, 2008 and Brazilian Application No. PI0800063-8 filed Jan. 29, 2008, all of which are hereby incorporated by reference in their entirety.

BACKGROUND OF THE INVENTION

1 Field of Invention

The present invention relates to a reactor for the continuous production of charcoal for use in the steel and iron industry (Blast Furnaces), said reactor having a substantially vertical structure and comprising, in sequence, a top charging zone, a drying zone, a carbonization zone, a cooling zone and a discharge zone, wherein the charging zone has a smaller cross section than the drying zone and has an extension into the drying zone, forming an annular space around the extension, in which space the wall of the drying zone has an outlet to a gas extraction line for the recirculation of these gases into the reactor.

2 Description of Related Art

Reactors for the continuous production of charcoal are well-known, for example, from documents FR 2,416,931, U.S. Pat Nos. 5,584,970 and 1,739,786.

FR 2,416,931 discloses a process for the continuous production of charcoal in a moving bed reactor, comprising a reduced section charging stack H, wherein the level of wood is periodically controlled to ensure that the stack is constantly charged with wood. Then a vat C with a substantially larger section is provided, wherein the wood is progressively dried and then carbonized under the effect of the hot gas coming from the lower section of said vat. The pyroligneous vapors are evacuated from the vat through an extraction line and conveyed into a chamber F which connects to a lower section of the vat C, into which chamber the hot gases coming from a heatexchanger E are simultaneously injected. The gas products are evacuated from a chamber D, located essentially at the same level as chamber F, and conveyed to a space connected to the heat exchanger E. Below the carbonization zone of the vat C is a compartment R for cooling the charcoal by recycling the gas extracted from said compartment through a water-cooled line inside a column L and reinjecting it into the compartment.

U.S. Pat. No. 5,584,970 discloses a reactor comprising a charging chamber (2), a preheating zone (3) to dry the wood, a carbonization zone (4), an optional calcination zone (5) and a cooling zone (6). Annular chutes (28 and 38) having a conical shape are provided between the different zones, and the hot gas extracted at the outlet of the carbonization zone is circulated mixed with (colder) exhaust gas and reinjected around the chute located between the drying zone and the carbonization zone. The cooling gas that feeds the cooling zone is extracted around the lower cone and passed through a cooler. Exhaust gas containing combustible elements is extracted from the top of the preheating zone and partially transported to a combustion chamber (11), and the gas extracted from this chamber is used to preheat the air in heat exchangers (16 and 17) before being discharged.

In particular in FR 2,416,931, and on a smaller scale in U.S. Pat. No. 5,584,970, the charging zone has a smaller cross section than the subsequent preheating zone and partially projects into the latter, forming in this region a "double tube" structure. As also disclosed in U.S. Pat. No. 1,739,786, this overlapping has the function of, during the extraction of the hot gases at the top of the preheating zone, keeping the wood charge off the gas outlet, thus preventing the sawdust from being conveyed into the gas conduit, consequently avoiding clogging and the need for frequent maintenance.

BRIEF SUMMARRY OF THE INVENTION

The main object of the present invention is to provide a reactor of the type described above, wherein the sawdust drag by the gases extracted from the preheating zone is further reduced, without substantially altering the shape and the size of the reactor.

The object proposed is achieved, according to the invention, by the fact that the charging zone is arranged eccentrically relatively to the drying zone, and the outlet to the gas extraction line of the drying zone is substantially located on the larger area section of the annular space.

The eccentricity between the charging zone and the drying zone enables a larger area to be created on the extraction side, which results in a reduction of the gas flow speed and consequently in a reduction in the sawdust drag, without altering the cross sections of these two zones.

BRIEF DESCRIPTION OF THE FIGURES

The present invention will be described in more detail below, based on the example of an embodiment illustrated in the figures. The figures illustrate:

FIG. 3C—a partial and schematic side view of a non-circular cross section in the reactor of the present of the invention.

DETAILED DESCRIPTION OF VARIOUS EMBODIMENTS OF THE INVENTION

Figure 1:
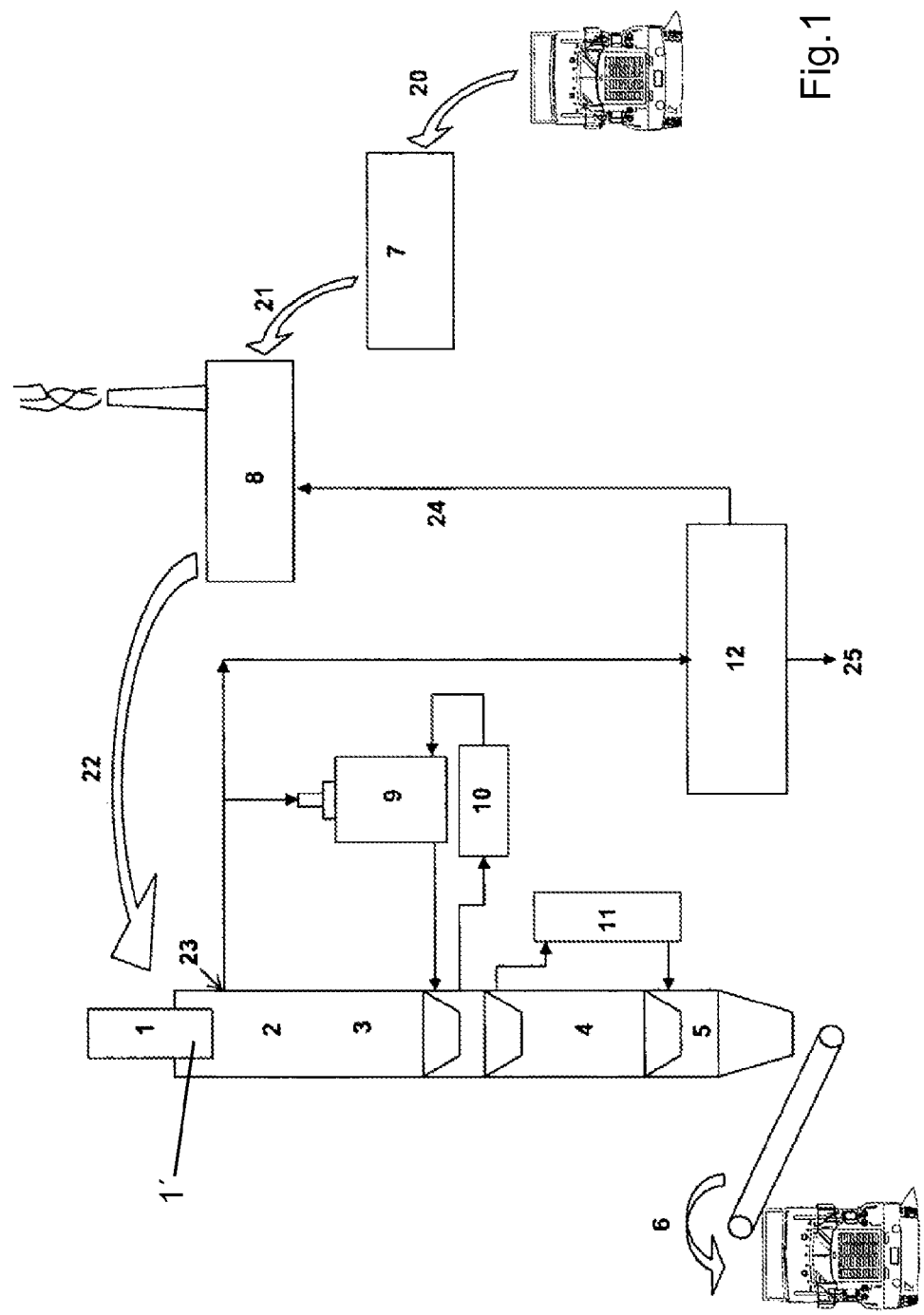
FIG. 1—a simplified schematic view of the different zones of a reactor for the continuous production of charcoal, including the external equipment and the charge and discharge steps.

As shown in FIG. 1, initially, the damp wood in logs is fed in 20 and cut in a wood cutting machine 7. The wood chips are then conveyed in 21 to the dryer 8 to be dried and then charged in 22 into the reactor.

The carbonization furnace or reactor conventionally comprises the charging zone 1 at the top then, in descending order, the drying zone 2, which has a larger diameter than the charging zone 1, the carbonization zone 3, the cooling zone 4, and the discharge zone 5.

The wood descends as the charcoal is mechanically removed from the bottom through the valve openings, maintaining the continuity of the process.

During the drying in the drying zone 2 of the reactor, dampness is removed from the wood and the pyrolysis phase starts in the carbonization zone 3. The carbonization temperature of the wood chips must be between 400 and 600° C. and it is a function of the desired fixed carbon content.

The temperature is reached by burning the gases sucked from the process itself and conveyed to the hot gas generator, by the continuous furnace. The temperature of the burnt gas is adjusted by dilution with cooled gas in the heat exchanger. The wood reaches the carbonization temperature and remains at this temperature for the time necessary to attain the physical-chemical conditions of the coal.

The subsequent steps are the cooling in the cooling zone 4, wherein the product reaches a temperature between 40 and 60° C., and the discharge in the discharge zone 5.

After the removal of the coal in 6, the product is sieved, weighed and stored in silos.

FIG. 1 further shows the external flow of the recycling gases. Part of the hot gas is extracted above the drying zone, in 23, where a portion of these gases is conveyed to a burner or Hot Gas Generator 9 (HGG), where it is burned in the presence of air at sub-stoichiometric conditions. The hot gas generated is subsequently reintroduced into the reactor to promote the carbonization of the wood. The other portion of the gases extracted in 23 is conveyed to a power plant 12 to generate electric power 25, and the exhaust gases from the power plant can be conveyed through 24 to the wood chip drier 8. References 10 and 11 designate coolers.

Figure 2A:
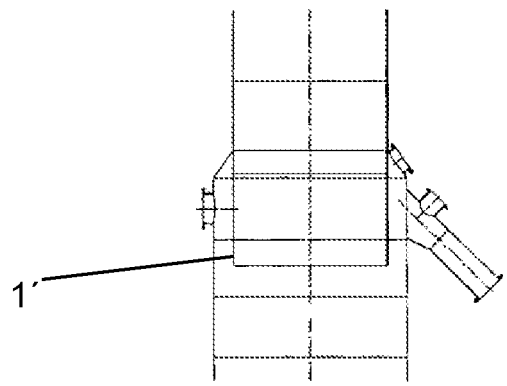
FIGS. 2A and 2B—respectively, a partial and schematic side view and a top sectional view of the double tube region formed in the transition between the charging zone and the drying zone in a prior-art reactor.
Figure 2B:
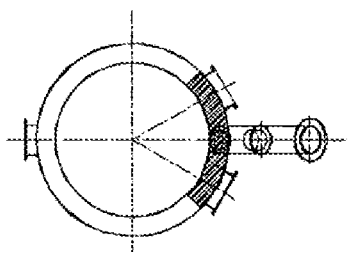

The detail illustrated in FIGS. 2A and 2B shows the double tube region in a conventional furnace, i.e., the transition region between the charging zone 1 and the drying zone 2, wherein the cylinder that encompasses the charging zone extends into the drying zone 2, forming an annular space around the lower end of the cylinder of the charging zone 1.

Figure 3A:
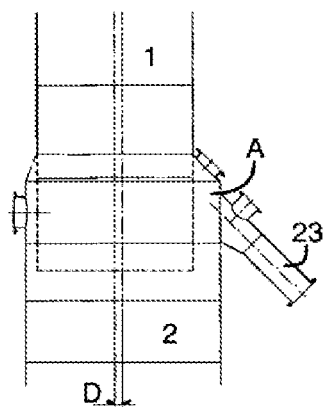
FIGS. 3A and 3B—respectively, a partial and schematic side view and a top sectional view of the eccentric double tube region formed in the transition between the charging zone and the drying zone in the reactor of the present invention.
Figure 3B:
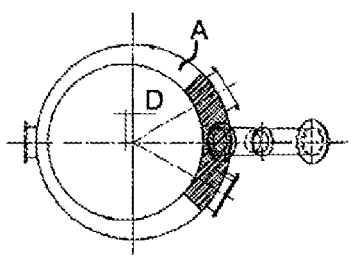

FIGS. 3A and 3B illustrate the same views as the previous figures, but showing the furnace of the present invention, wherein the double tube is eccentric relatively to the vertical axis of the furnace and the vertical geometric axes of the cylinder of the charging zone 1 and of the cylinder of the drying zone are set apart by the distance D.

The eccentricity measured as the distance D between the vertical geometric axis of the charging zone 1 and the vertical geometric axis of the drying zone 2 varies from 2.5 to 10.0% of the diameter of the drying zone 2, preferably from 4.0 to 7.0%. As an example, for a reactor having a charging zone 1 with a diameter of about 2,000 mm and a drying zone 2 with a diameter of about 2,500 mm, the distance D between the vertical geometric axis of the charging zone 1 and the vertical geometric axis of the drying zone 2 can be of 50 to 150 mm, preferably approximately 100 mm.

Figure 3C:
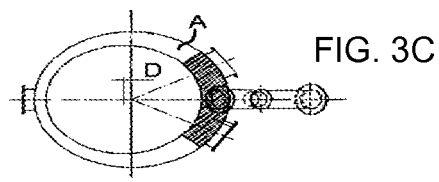

It is also possible to design the reactor with a non-circular cross section, such as ellipsoidal, "water drop" or bulge, among others(see FIG. 3C). The eccentricity between the charging zone and the drying zone is determined in such cases with respect to the geometrical center of the respective cross sections.

As already mention with respect to the prior art, the hot gases that ignite inside the drying zone are extracted through line 23 (FIG. 3B) from the annular space A formed in the double tube region for subsequent recycling. Additionally, as already mentioned with respect to FIG. 1, the gas extracted through line 23 is partially directed to the HGG 9. As can be inferred from a comparison between the cross sections illustrated in FIGS. 2B and 3B, the eccentricity promotes an increase in the cross-sectional area, reducing the gas flow speed at the extraction point and consequently also reducing the sawdust drag.

As an example, taking as a basis the hatched area in FIG. 2B, of 0.433 $m^2$, with a gas flow speed of 2.06 m/s, a distance D of 100 mm between the axes of the charging and drying zones, as illustrated in FIG. 3B, results in an increase of the same area to 0.570 $m^2$ and in a reduction the gas flow speed to 1.57 m/s.

Having described an example of a preferred embodiment, it should be understood that the present invention can be carried out in other manners and that its scope is limited solely by the appended claims, including therein the characteristics equivalent to those expressly defined.

The invention claimed is:

1. A reactor for the continuous production of charcoal, having a substantially vertical structure, comprising, in sequence, a top charging zone, a drying zone, a carbonization zone, a cooling zone, a discharge zone, wherein:
   the top charging zone has a smaller cross section than the drying zone and has an extension into the drying zone, forming an annular space around the extension;
   the annular space comprises, in the wall of the drying zone, an outlet to a gas extraction line for the recirculation of gases into the reactor;
   the top charging zone is arranged to create an eccentricity with respect to the drying zone; and
   the outlet to the gas extraction line of the drying zone is substantially located in the larger area section of the annular space.

2. The reactor according to claim 1, wherein the reactor comprises a substantially cylindrical shape.

3. The reactor according to claim 2, wherein the eccentricity, measured as a distance between a vertical geometric axis of the top charging zone and a vertical geometric axis of the drying zone, is from 2.5 to 10.0% of a diameter of the drying zone.

4. The reactor according to claim 3, wherein the eccentricity is from 4.0 to 7.0% of the diameter of the drying zone.

5. The reactor according to claim 3, wherein:
   the charging zone has a diameter of about 2,000 millimeters and the drying zone has a diameter of about 2,500 millimeters; and
   the distance between the vertical geometric axis of the charging zone and the vertical geometric axis of the drying zone is from 50 to 150 millimeters.

6. The reactor according to claim 5, wherein the distance is 100 millimeters.

7. The reactor according to claim 1, wherein the reactor comprises a non-circular cross section and an eccentricity between the charging zone and the drying zone is determined with respect to a geometrical center of the respective cross sections of the charging zone and the drying zone.

* * * * *